US007342490B2

(12) United States Patent
Herrmann et al.

(10) Patent No.: US 7,342,490 B2
(45) Date of Patent: Mar. 11, 2008

(54) RADIO FREQUENCY IDENTIFICATION STATIC DISCHARGE PROTECTION

(75) Inventors: Scott John Herrmann, Hollister, CA (US); Mark Alfred Hadley, Fremont, CA (US); Gordon Samuel Wiggins Craig, Palo Alto, CA (US); John Berhard Hattick, Morgan Hill, CA (US); Paul Stephen Drzaic, Morgan Hill, CA (US); Eric Ryan Kanemoto, San Jose, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 482 days.

(21) Appl. No.: 10/997,608

(22) Filed: Nov. 23, 2004

(65) Prior Publication Data

US 2006/0117554 A1   Jun. 8, 2006

(51) Int. Cl.
*G08B 13/14* (2006.01)
(52) U.S. Cl. .............................. 340/527.7; 340/572.1; 340/572.8; 29/829; 156/243
(58) Field of Classification Search ............ 340/572.7, 340/572.1, 572.4, 572.6, 572.8, 573.3; 29/829; 156/243, 253, 302
See application file for complete search history.

(56) References Cited

U.S. PATENT DOCUMENTS 5,545,291 A    8/1996  Smith et al.
6,537,932 B1 *  3/2003  Fitting et al. ............... 442/114
6,606,247 B2    8/2003  Credelle et al.
6,951,420 B1 * 10/2005  Leighton .................... 383/61.2
7,005,027 B2 *  2/2006  Valenti et al. .............. 156/202
7,158,037 B2 *  1/2007  Forster et al. ........... 340/572.8

FOREIGN PATENT DOCUMENTS

DE          40 24 723 A1    8/1990
DE         196 14 914 A1    4/1996
EP           1 031 940 A    2/1999
WO        WO 01/03188 A    1/2001

OTHER PUBLICATIONS

PCT Notification of Transmittal of the International Search Report and The Written Opinion of the International Search Report, PCT/US2005/039755, mail date Dec. 8, 2006, 15 pages.

* cited by examiner

*Primary Examiner*—Davetta W. Goins
(74) *Attorney, Agent, or Firm*—Blakely, Sokoloff, Taylor & Zafman LLP

(57) ABSTRACT

Methods and apparatuses for the protection of radio frequency identification (RFID) devices are described. In one aspect, a static dissipative material is applied to a web of antenna structures. A coating of the static dissipative material is applied continuously across a plurality of antenna structures of a roll of the web material. An RFID integrated circuit (IC) is attached to the web of antenna structures with the dissipative coating, then subsequently tested on the roll. Additional processing is performed to the RFID tag to produce an RFID label.

43 Claims, 12 Drawing Sheets

A - A

B - B

RADIO FREQUENCY IDENTIFICATION STATIC DISCHARGE PROTECTION

GOVERNMENT RIGHT NOTICE

Embodiments of the present invention were made with government support under North Dakota State University Subcontract SB004-03, Defense Microelectronics Activity (DMEA) Sponsor Cooperative Agreement No. 90-03-2-0303 (prime). The government has certain rights to this invention.

TECHNICAL FIELD

This disclosure relates generally to Radio Frequency Identification (RFID) devices or tags, and in particular but not exclusively, relates to apparatuses and manufacturing processes for protecting RFID tags from electrostatic discharge (ESD).

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the data as described below and in the drawings hereto: Copyright© 2003, Alien Technology Corporation, All Rights Reserved.

BACKGROUND INFORMATION

There are many examples of functional elements or components which can provide, produce, or detect electromagnetic signals or other characteristics. These functional components may be used to make electronic devices. One example of such devices is that of a radio frequency (RF) identification tag (RFID tag) which contains a chip (an integrated circuit, or IC) or several chips that are formed with a plurality of electronic elements. Information is recorded into these chips, which may then be relayed to a base station. Typically, this is accomplished as the RFID tag, in response to a coded RF signal received from the base station, functions to cause the tag to reflect the incident RF carrier back to the base station thereby transferring the information.

Functional components such as semiconductor chips having an RF circuit, logic and memory have been incorporated into an RFID tag. Such a tag may also have an antenna, as well as a collection of other necessary components such as capacitors or a battery, all mounted on a substrate and sealed with another layer of material. The antenna material can be a thin film metal which can be deposited on a substrate. Alternatively, the antenna material can also be affixed to the substrates using adhesive.

One type of process for manufacturing an electronic assembly, such as an RFID tag or label, involves a web process. In a web process, a web material of a carrier substrate is advanced through a web process apparatus using rollers. Functional components (blocks) are deposited on the carrier substrate web, for example, by using a fluidic self assembly (FSA) process, as described in U.S. Pat. No. 5,545,291, which is herein incorporated by reference. The FSA process deposits a plurality of functional blocks onto the web material wherein the blocks fall into recessed regions found in the web material. At a further point in the web process, a flexible carrier strap comprising the functional components (e.g. RFID chips) of the carrier substrate is coupled to a web of receiving substrate which also comprises functional components, such as antennas. Further details of such a manufacturing process are described in U.S. Pat. No. 6,606,247, which is herein incorporated by reference. The assembly of these components often requires complex and multiple processes, which can cause the end product to be expensive. Accordingly, it is advantageous for manufacturing processes to provide satisfactory production yields.

One such factor which can adversely affect production yields during assembly of RFID tags is the risk of damaging electrostatic discharge events. Generally, static electricity is an electrical charge caused by an imbalance of electrons on the surface of a material. This imbalance of electrons produces an electric field that can be measured and that can influence other objects at a distance. Electrostatic discharge (ESD) is the transfer of charge between objects at different electrical potentials. ESD can change the electrical characteristics of a functional component or semiconductor device, thereby degrading or destroying it. When an ESD sensitive electronic device, such as an integrated circuit (IC) in an RFID tag, is exposed to an ESD event, it may negatively impact the RF performance of the device, or the device may even no longer function (i.e. catastrophic failure). For example, a damaging ESD event may cause a metal melt, junction breakdown, oxide failure, or other permanent damage to the device's circuitry causing the device to fail.

Electrostatic charge is most commonly created by the contact and separation of two materials. Creating electrostatic charge by contact and separation of materials is known as "triboelectric charging," which involves the transfer of electrons between materials. An example of triboelectric charging is illustrated by FIGS. 1A and 1B. The atoms of a material with no static charge have an equal number of positive (+) protons in their nucleus and negative (−) electrons orbiting the nucleus. FIG. 1A illustrates an example of two uncharged materials coming into contact with each other. In FIG. 1A, Material A consists of atoms with equal numbers of protons and electrons. Material B also consists of atoms with equal (though perhaps different) numbers of protons and electrons. Both materials are electrically neutral. When the two materials are placed in contact and then separated, as illustrated in FIG. 1B, negatively charged electrons may be transferred from the surface of one material to the surface of the other material. Which material loses electrons and which gains electrons will depend on the nature of the two materials. The material that loses electrons becomes positively charged, while the material that gains electrons is negatively charged. A charge (q) on an object creates an electrostatic potential between itself and another object that is the quotient of the charge difference between the objects ($\Delta q$) and the capacitance (C) between the objects, i.e. $V=\Delta q/C$. This is expressed in voltage. Furthermore, the system of the two objects has a potential energy equal to the product of the charge and the voltage. The swift release of this potential energy is the source of the ESD damage. When the potential difference exceeds the breakdown voltage of the air between the objects, a charge moves through the air to neutralize the charge difference. This is the ESD event. As described above, this potential energy can be released over very short time scales. Thus, the instantaneous power can be very high, which may result in fusing metal, perforating junctions, or other types of damage.

The process of material contact, electron transfer and separation, is often a more complex mechanism than described above. The amount of charge created by triboelectric generation is affected by the area of contact, the speed of separation, and relative humidity, material types among other factors. Once the charge is created on a material, it becomes an "electrostatic" charge if it remains on the material. This charge may be transferred from the material, creating an electrostatic discharge (ESD) event. Additional factors such as the resistance of the actual discharge circuit, the contact resistance at the interface between contacting surfaces and the capacitance between the objects also affect the magnitude of the current that can cause damage. An electrostatic charge also may be created on a material in other ways such as by static induction, ion bombardment, or contact with another charged object. However, triboelectric charging is often the most common.

FIG. 2 illustrates an example of a roll to roll web processing apparatus 200, such as that used to manufacture RFID tags and labels. Generally, as described herein, an RFID tag includes an RFID IC attached to an antenna structure. A web material having a plurality of antennas attached thereto may be referred to as antenna stock. An RFID inlet (also known as an RFID Inlay) is an antenna with an attached strap. An inlet web is a web of antennas with attached straps. Further, an RFID label is, for example, an inlet covered on one side by a paper covering and an adhesive backing on the other side. An inlet with a covering on the antenna side may be referred to as an RFID tag. The RFID label may be singulated, or may still be on the web material (e.g. a roll of many RFID labels). RFID tags and labels are manufactured in a conversion process in which a web of material goes through many process steps. Label converters are processing apparatuses that convert the inlet web into the final RFID labels. FIG. 2 may be considered to represent a case in which an antenna stock is being processed in a roll to roll manufacturing operation which includes the attachment of RFID ICs (e.g. RFID ICs carried on straps) onto the antennas on the antenna stock. For example, the web of material may have conductive antennas adhered to it at a fixed pitch. This web will naturally build up large static charges on its surfaces as it comes into contact with other materials and is disengaged, such as when it passes over a roller.

During the manufacturing process, as a carrier web 201 passes over various rollers 204, 206, there are multiple opportunities for electrostatic discharge (ESD) events to occur. The carrier web 201 has small conductive functional components 202 (e.g. an RFID IC coupled to an antenna) deposited on a front side 203 of the web 201. In the simplest case, the web 201 passes over a roller 204 so that the non-conductor side 205 contacts the roller 204. The roller 204 is typically metallic. The web 201 may be unrolling from a spindle or roll at this point, or it maybe passing over the roller 204 from another process. It should be noted that triboelectrification can occur when two layers of a material are separated from each other. The web 201 is often made of a plastic material, with functional components 202 deposited thereon on one side 203. Since the web 201 and roller 204 are in contact with each other and then separate, there is an opportunity for triboelectrification, as described above. In this example, positive charges 207 occur on the roller 204 and negative charges 208 occur on the backside 205 of the web 201. The functional components 202 are conductive islands, and will experience a negative electrostatic potential.

As these components 202 approach a metallic roller 206, there may be a sudden transfer of charge, or an electrostatic discharge (ESD) event 210. This typically occurs when the air gap between a component 202 and the roller 206 is so small that the resulting field is greater than the breakdown field of air. Since this is often a metal-to-metal discharge, the ESD is a fast rising (e.g. about 100 picoseconds), narrow (e.g. less than about 500 picoseconds) current pulse. For approximately a 5000 volt static potential, the peak current may exceed about 50 amperes. This high instantaneous power may damage or render the functional components 202 inoperable, as described above, leading to a decreased production yield. Accordingly, it is desirable to control and reduce the likelihood of such damaging ESD events during the production of RFID inlets, tags and labels.

SUMMARY OF THE DESCRIPTION

The present invention relates to methods and apparatuses for protecting Radio Frequency Identification (RFID) tags from electrostatic discharge (ESD). In certain exemplary embodiments of one aspect of this disclosure, a plurality of RFID antenna structures are deposited onto a front side of a web material. A static dissipative material is also applied to the web material. In certain exemplary embodiments, the static dissipative material may be in contact with a plurality of the antenna structures. The static dissipative material may also be applied continuously across a plurality of the antenna structures. The static dissipative material may be applied as a coating, such as a coating of conducting or semiconducting particles dispersed in a waterborne coating material, conducting or semiconducting particles dispersed in a non-aqueous coating material, conductive or partially conductive coatings in an aqueous or a non-aqueous coating material, or a coatable material that can be cured to form a solid film upon some curing process. The coating of dissipative material may also be applied as a continuous strip intersecting a plurality of antenna structures. In other exemplary embodiments, the static dissipative material is applied to the back side of the web material. A strap including an RFID integrated circuit (IC) may be coupled to the web of antenna structures having the static dissipative material thereon. In yet another aspect, an RFID tag may be tested while the RFID tag is attached to the web material.

The present invention is described in conjunction with methods, apparatuses and systems of varying scope. In addition to the aspects of the present invention described in this summary, further aspects of the invention will become apparent by reference to the drawings and by reading the detailed description that follows.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a method and apparatus for radio frequency identification static discharge protection are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Embodiments of the present invention describe methods and apparatuses for incorporating electrostatic discharge protection into RFID inlets and labels during the manufacturing process. Certain aspects described herein contribute to preventing, removing, dissipating, or suppressing charge build up during the manufacturing process and eliminating the electrostatic potential and concomitant potential energy caused by the charge build-up. Other aspects described below contribute to preventing or limiting potential damage from an ESD event. In one embodiment, static discharge can be controlled by incorporating a static dissipative material into the construction of the RFID tag. In another embodiment, a static dissipative material may be used during the manufacturing process. Incorporating static dissipative materials into the RFID tag material construction reduces the risk of ESD damage during high speed roll to roll web processing where static build up and discharge cannot always be controlled to necessary levels. By building in protection, the resulting RFID tag will be less reliant on internal ESD control devices (e.g. ESD protection circuitry within the RFID ICs) to protect the RFID tag during subsequent processing.

Figure 1A:
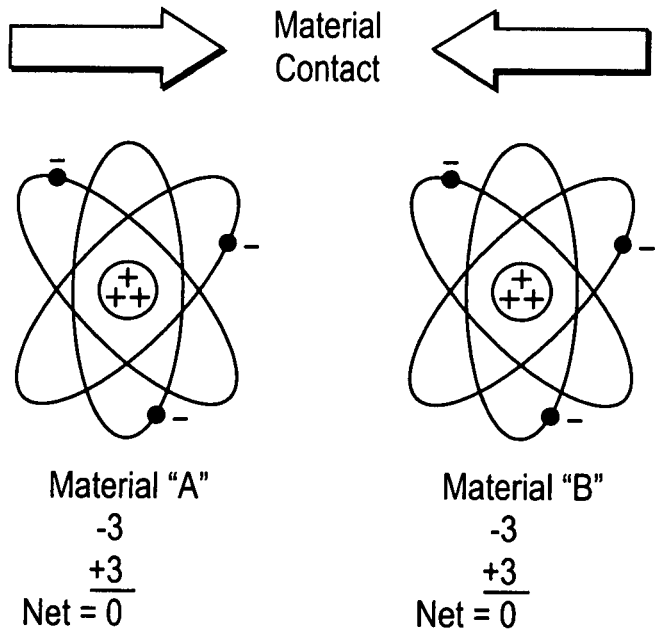
FIG. 1A illustrates an example of two uncharged materials coming into contact with each other.
Figure 1B:
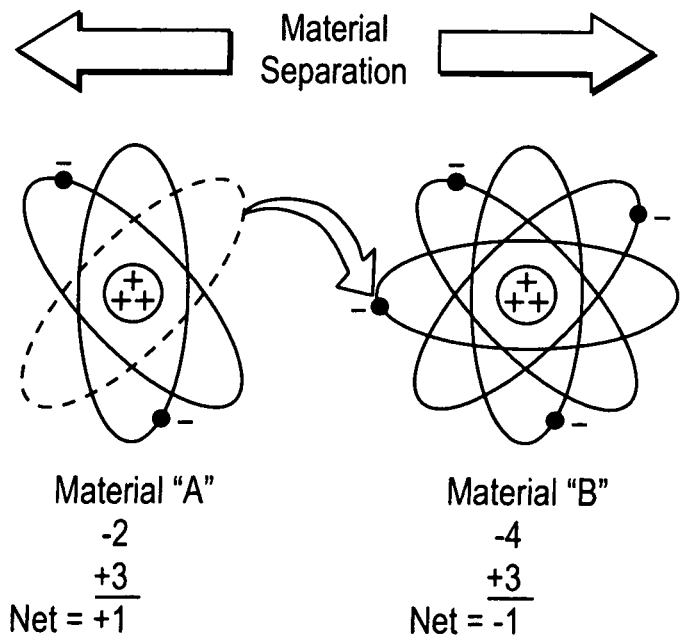
FIG. 1B illustrates two materials separated from each other.
Figure 2:
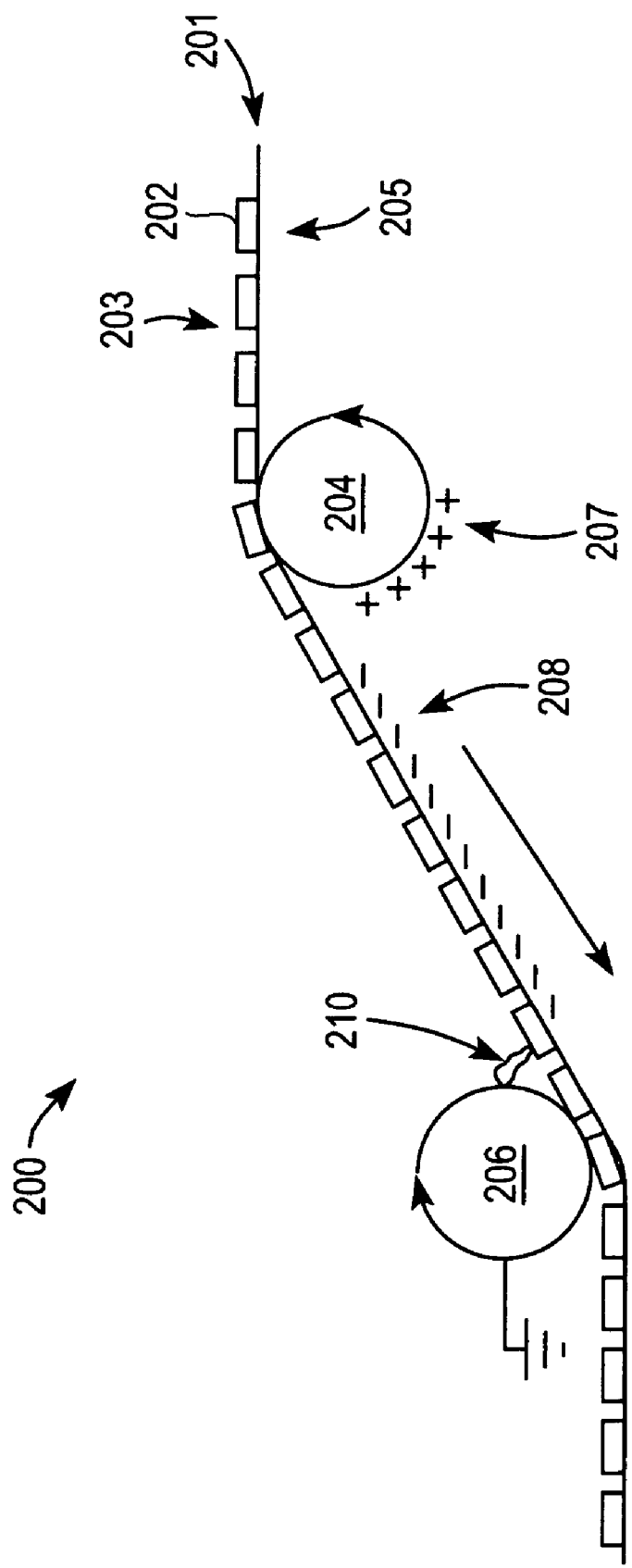
FIG. 2 illustrates an example of a roll to roll web processing apparatus.
Figure 3:
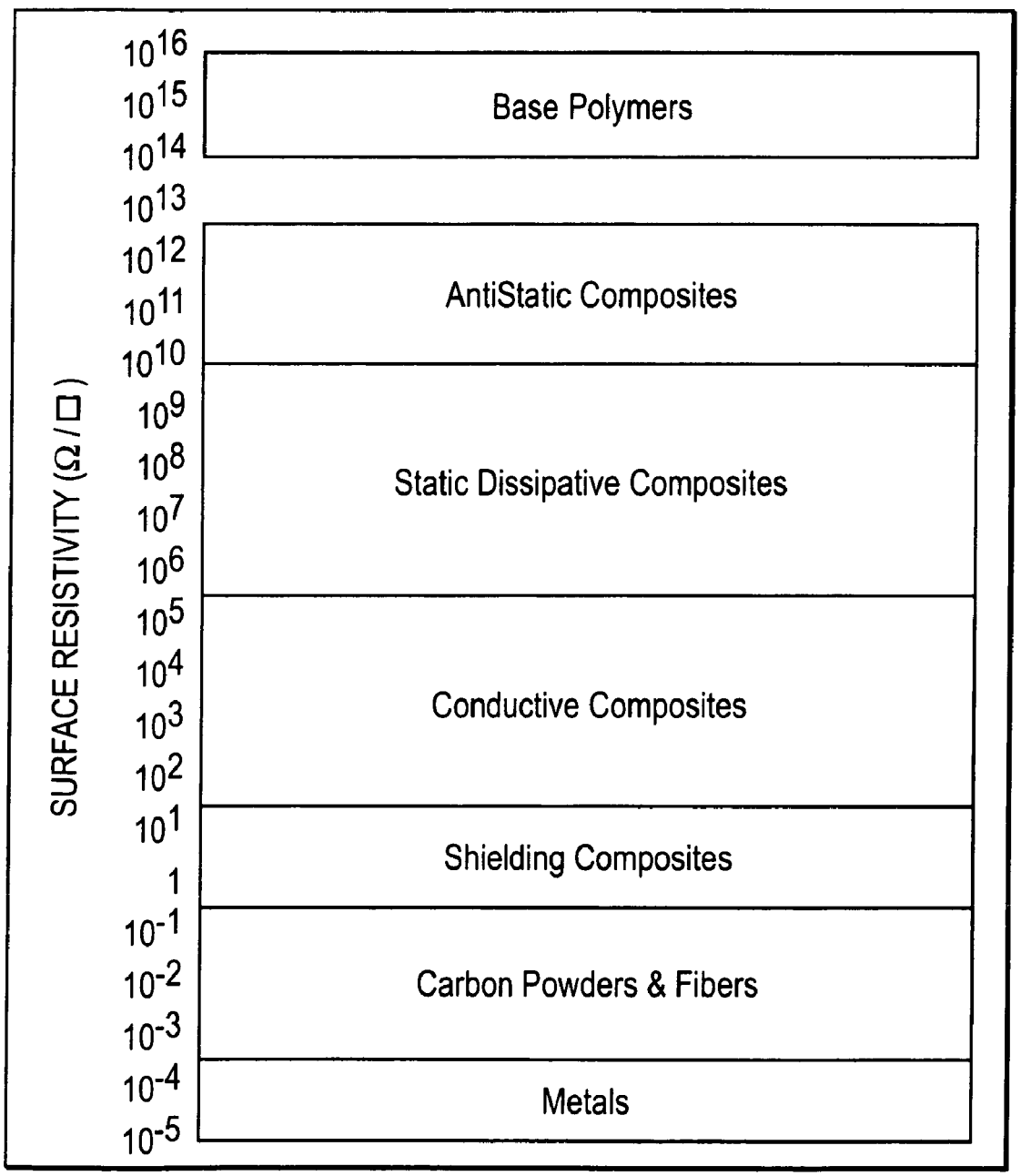
FIG. 3 illustrates a chart of surface resistivity for several types of materials.

FIG. 3 illustrates a chart of the approximate surface resistivity of several types of materials, which is measured in terms of Ohms per Square ($\Omega/\square$ or ohms/sq). As illustrated in FIG. 3, static dissipative materials are generally classified by having a surface resistivity of between about $10^6$ to about $10^{10}$ ohms/sq. Static dissipative materials allow a charge to spread over it's entire surface and resist the flow of this charge. As such it may help to prevent high current flows during electrostatic discharge. As such, some static dissipative materials are referred to as having "anti-static" properties. Furthermore, some anti-static materials, e.g. materials with surface resistivity of between about $10^{10}$ to about $10^{13}$ ohms/sq, also have static dissipative properties. Conductive materials generally have lower surface resistivity than static dissipative materials, while insulative materials generally have larger surface resistivity than anti-static and static dissipative materials.

Generally, all materials are subject to triboelectrification. The separation of two materials causes a separation of charge. The separation of charge causes an electrostatic potential between the objects so charged, all other objects and ground. In insulators, this charge is essentially fixed and immobile. As surface resistivity decreases, electron mobility increases. Since the electrons of a static dissipative material are mobile, they move to reduce the total potential energy of the system available to cause damage in an ESD event. The higher the electron mobility, the shorter the discharge time and the greater the instantaneous power of a discharge. The time frame of the ESD event is the inverse of the product of the resistance and the capacitance, i.e. $t=1/RC$. The longer the time constant, the lower the peak power of the event. Anti-static coating resistivities are intermediate between insulators and conductors, and therefore are able to slow the discharge event, and reduce the instantaneous power of the event to a level that is less likely to cause damage to the device.

One example of a material having static dissipative properties that may be used with embodiments of the present invention is an acrylic coating with conductive tin oxide dispersed within it. In another embodiment, a static dissipative material includes indium oxide. In another embodiment, the static dissipative material may include Indium Tin Oxide (ITO), which is a mixture of indium oxide and tin oxide. In one embodiment, the chemical composition of the ITO material is about 91 mol. % $In_2O_3$/9 mol. % $SnO_2$. In one embodiment, an acrylic coating with dispersed tin oxide powder is incorporated into the manufacturing process. An acrylic coating with dispersed tin oxide powder suitable for use with embodiments of the present invention is available from R&D Money Company of Morgan Hill, Calif., SPEC-STAT® ESD Clear WB Acrylic, P/N 448-7-400.

In one embodiment, the static dissipative material selected is conductive enough to provide protection against ESD, but not so conductive as to interfere with the electrical operation of the RFID antenna. For example, the static dissipative material does not interfere with the electrical operation of the RFID IC and antenna (after they are assembled together) so that testing of the assembly may be performed while a plurality of such assemblies (e.g. a plurality of straps and RFID antennas attached together) are on a roll of assembled straps and antennas. Although embodiments of the present invention are primarily described using materials having static dissipative properties, other materials having greater or lesser surface resistivity may be used to impart protection from ESD within an RFID manufacturing process. For example, a material with a resistivity as low as 500 $\Omega/\square$ could impart ESD protection.

Figure 4:
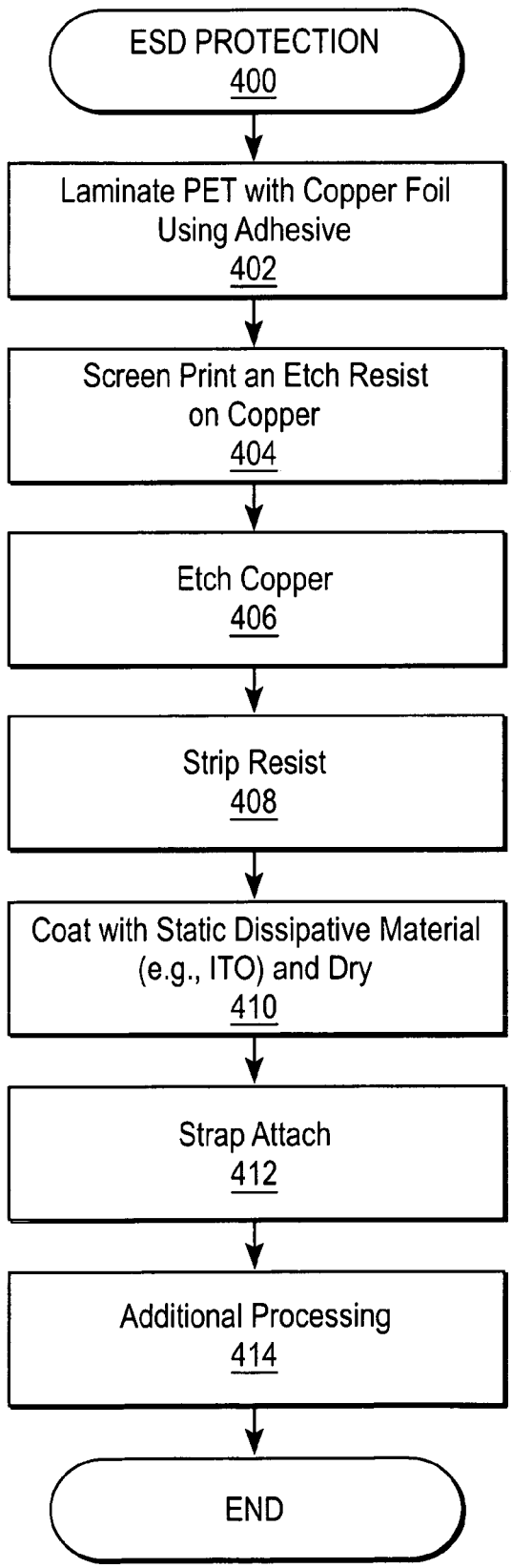
FIG. 4 illustrates an overview of an embodiment of a method for incorporating ESD protection during manufacture of an RFID tag.
Figure 5A:
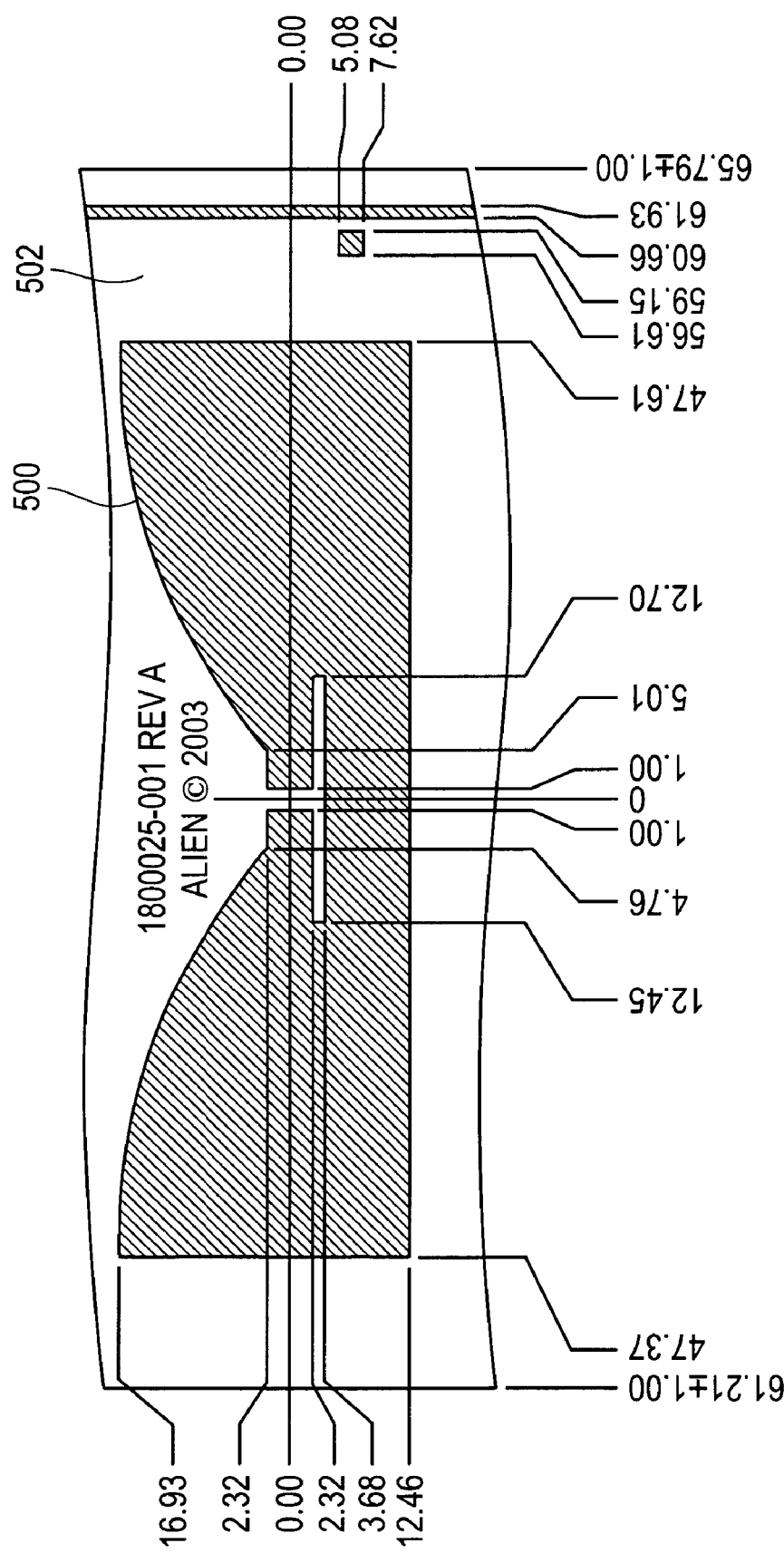
FIG. 5A illustrates an embodiment of an antenna attached to a carrier web.

FIG. 4 illustrates an overview of an embodiment of a method 400 for incorporating ESD protection during manufacture of an RFID tag. In particular, method 400 describes an embodiment in which a static dissipative material is applied to a carrier web of antennas during an RFID tag manufacturing process. It will be appreciated that static dissipative or other materials may be applied at other stages in the manufacturing process, as further described below. In one embodiment, a copper foil is laminated to a poly (ethylene terephthalate) (PET) carrier web using an adhesive, such as an epoxy-based adhesive (block 402). In one embodiment, the PET carrier web is about 1 mil (25 microns) thick. An etch resist is then screen printed on the copper (block 404). For example, the resist may be patterned in the desired shape of the antenna. The copper is then etched (block 406). The etch resist is then stripped from copper (block 408). At this point, a copper antenna is attached to the PET carrier web, for example, as illustrated in FIG. 5A, described below. It will be appreciated that other suitable materials may be used for the antenna, such as silver or aluminum.

If appropriate measures are not implemented to minimize ESD, once the RFID IC is attached, the RFID tag may be vulnerable to damage from ESD. The large copper antennas mounted on an insulative material (e.g. PET carrier web) can build up thousands of volts of charge throughout a conventional web process. For example, if the antenna is charged to a different voltage than a strap prior to attaching said strap having an RFID IC, it is possible to damage the RFID IC during the strap attach process. Further, without appropriate countermeasures, if after strap attach the copper antenna contains charge and contacts a grounded conductive surface or contacts an ungrounded conductive surface charged to a different voltage (such as another antenna on the web or ungrounded conductive process equipment), the resulting ESD may be very damaging to the RFID tag, since the RFID IC of the strap is typically electrically interconnected (e.g. through an electrically resistive connection) to the antenna.

Accordingly, in one embodiment, a material having static dissipative properties, such as dispersed ITO powder, is applied to the carrier web and dried (block 410). The static dissipative material may be applied to the carrier using an adhesive. In one embodiment, the static dissipative material is applied to the front side (antenna side) of the carrier web. In one embodiment, the static dissipative material is selected such that it does not have a significant adverse impact on the functionality of the RFID antenna. For example, the material does not prevent the testing of the assembled RFID tags while still on a roll (before being singulated from the roll). Flexible carrier straps of RFID ICs are then attached (electrically interconnected) to the antennas on the carrier web (block 412). Details of the strap attach process are discussed in U.S. Pat. No. 6,606,247, referenced above, and illustrated below with respect to FIG. 7. Additional processing of the RFID tags, such as testing the operation of RFID tags and converting the RFID tags into RFID labels are subsequently performed (block 414).

FIG. 5A illustrates an embodiment of an antenna 500 attached to a carrier web 502. The construction of the embodiment illustrated in FIG. 5A is similar to the antenna and carrier web after the processing represented by block 408 of FIG. 4. FIG. 5A illustrates a view of the front side (antenna side) of the web 502. In one embodiment, the antenna 500 may be made of a metallic material, such as copper. In one embodiment, the carrier web 502 may be made of poly(ethylene terephthalate) (PET). In one embodiment, the carrier web is about 127 mm wide. In one embodiment, the antenna has a width of about 94.98 mm, and a height of about 29.39 mm. Other shapes, designs, materials, dimensions, and constructions are contemplated for the antenna 500 and carrier web 502. The dimensions of the antenna may be approximately about 95 mm by 30 mm.

Figure 5B:
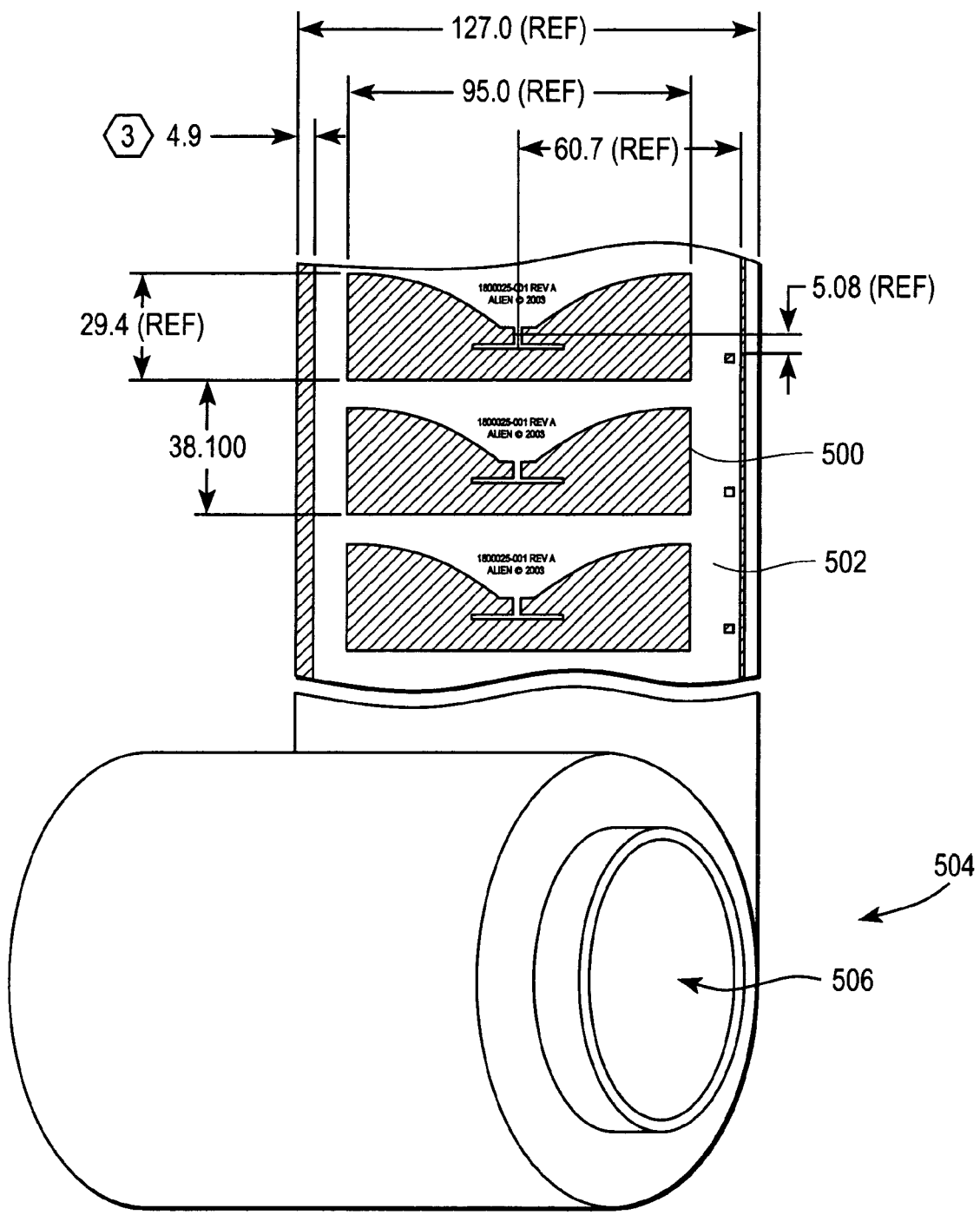
FIG. 5B illustrates an embodiment of a continuous roll of antennas attached to a continuous carrier web.

FIG. 5B illustrates an embodiment of a continuous roll 504 of antennas 500 attached to a continuous carrier web 502. In one embodiment, the roll 504 is wrapped in an orientation with the antenna side facing the core 506 of the roll 504. In one embodiment, adjacent antennas 500 are spaced about 8.7 mm apart on the roll 504. Roll 504 is used in embodiments of the web processes described above. In one embodiment, the web 502 is fed into a web process where rollers advance the web 502 material through the various processing stages.

Figure 5C:
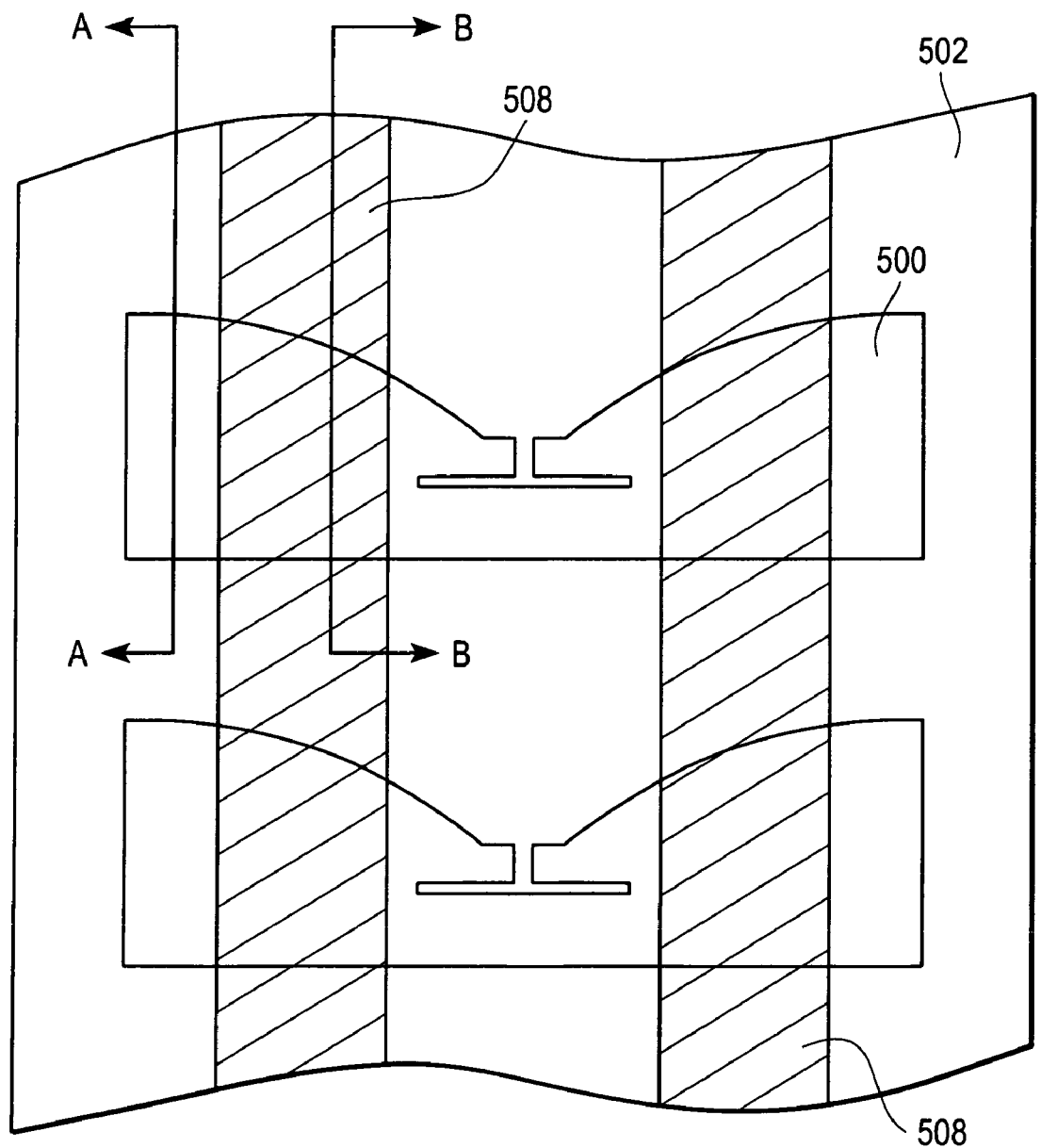
FIG. 5C illustrates an embodiment of a static dissipative material applied to the antenna carrier web.

FIG. 5C illustrates an embodiment of an antenna 500 attached to a carrier web 502, wherein static dissipative material has been applied to the web 502. In one embodiment, the static dissipative material is applied as is described with respect to block 410 of FIG. 4. In one embodiment, a film or coating of dispersed ITO powder is applied in at least one continuous band, stripe or strip 508 along the length of the web 502, thereby electrically connecting at least a plurality of antennas if not all of the antennas on a roll of antenna stock. The continuous band 508 spans across or intersects a plurality of antenna structures 500. By applying a coating of static dissipative material across a plurality of antennas 500, a larger continuous static dissipative surface is created. In one embodiment, as illustrated in FIG. 5C, two bands of static dissipative material are applied to the length of the web 502. The two bands 508 are electrically connected through the antenna 500 and through the other antennas. In one embodiment, each band 508 of static dissipative material is between about 0.25 inches and 0.5 inches wide. In another embodiment, the band 508 of static dissipative material is about one inch wide. In one embodiment, the acrylic coating with the dispersed indium and/or tin oxide powder is between 0.005 and 0.1 mil thick dry.

Figure 5D:
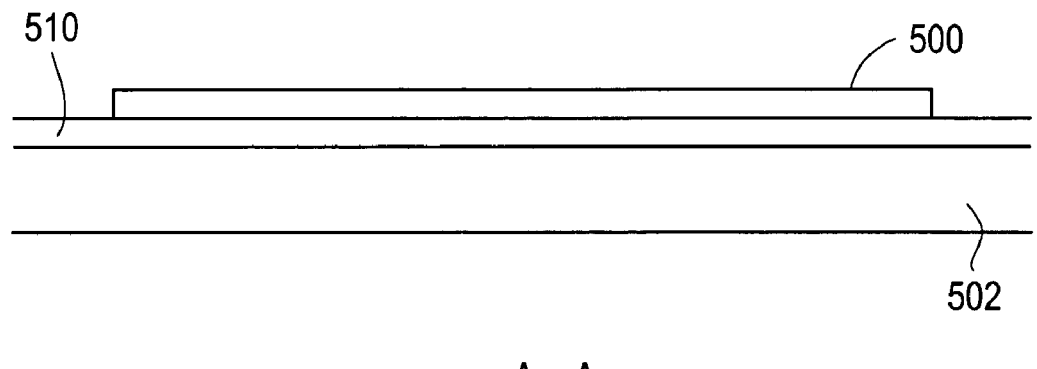
FIG. 5D illustrates a cross-sectional view of an embodiment of the carrier web along the line A-A of FIG. 5C.

FIG. 5D illustrates a cross-sectional view of an embodiment of the carrier web 502 along the line A-A of FIG. 5C. In one embodiment, the carrier web 502 is about 1 mil (25 microns) thick PET. The antenna 500 is attached to the web 502 by an adhesive 510. The adhesive 510 may remain on portions of the web 502 other than where the antenna 500 is positioned. FIG. 5D is illustrative of the state of the carrier web 502 after the processing represented by block 408 of FIG. 4.

Figure 5E:
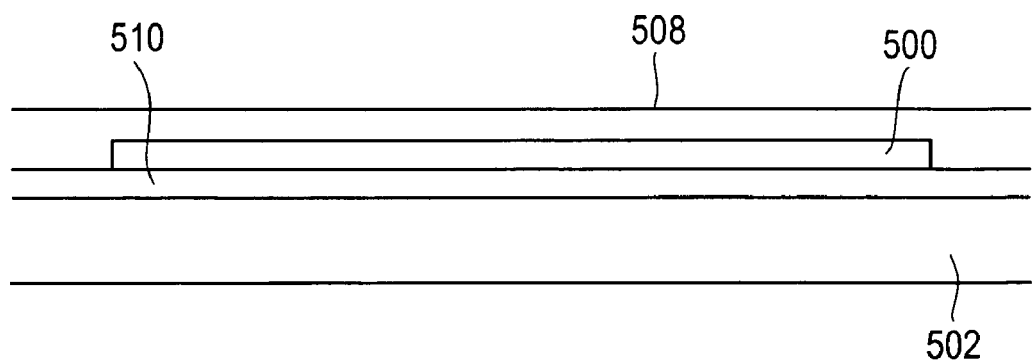
FIG. 5E illustrates a cross-sectional view of an embodiment of the carrier web along the line B-B of FIG. 5C.

FIG. 5E illustrates a cross-sectional view of an embodiment of the carrier web 502 along the line B-B of FIG. 5C. A layer of static dissipative material 508 is deposited over the antenna 500. The static dissipative material 508 is in electrical contact with the antenna 500, such that any charge on the antenna may be transferred to the static dissipative material 508. FIG. 5E is illustrative of the state of the carrier web 502 after the processing represented by block 410 of FIG. 4.

In one embodiment, an advantage of a using a continuous band of static dissipative material applied across a plurality of antennas, rather than a conductive material (e.g. a metal having a surface resistivity on the order of $10^{-5}$ ohms/sq), is that the dissipative material allows for testing the operation of the individual RFID tags while they are still on the roll; i.e. the antennas and the RFID ICs attached to their corresponding antennas, do not have to be singulated to be tested effectively. A conductive material linking adjacent tags may interfere with testing of a single tag on the roll of tags. Furthermore, by electrically linking a plurality of antennas together with static dissipative material, a larger area (e.g. antenna surface and static dissipative coating surface) is provided over which to spread charge and thereby bleed off charge from the roll of antennas. Thus, in one embodiment, using a static dissipative material allows for enough conductivity between adjacent antennas to conduct any built up charge on one antenna to adjacent antennas, reducing the potential energy of the system available for an ESD event, however, the static dissipative material is not so conductive so as to permit an ESD event at one RFID tag on a web to affect an adjacent RFID tag, nor does the static dissipative material conduct enough to permit adjacent RFID tags to interfere with testing of an individual RFID tag on the web while there are other RFID tags (with RFID ICs attached to their corresponding antennas) also on the web.

Figure 6:
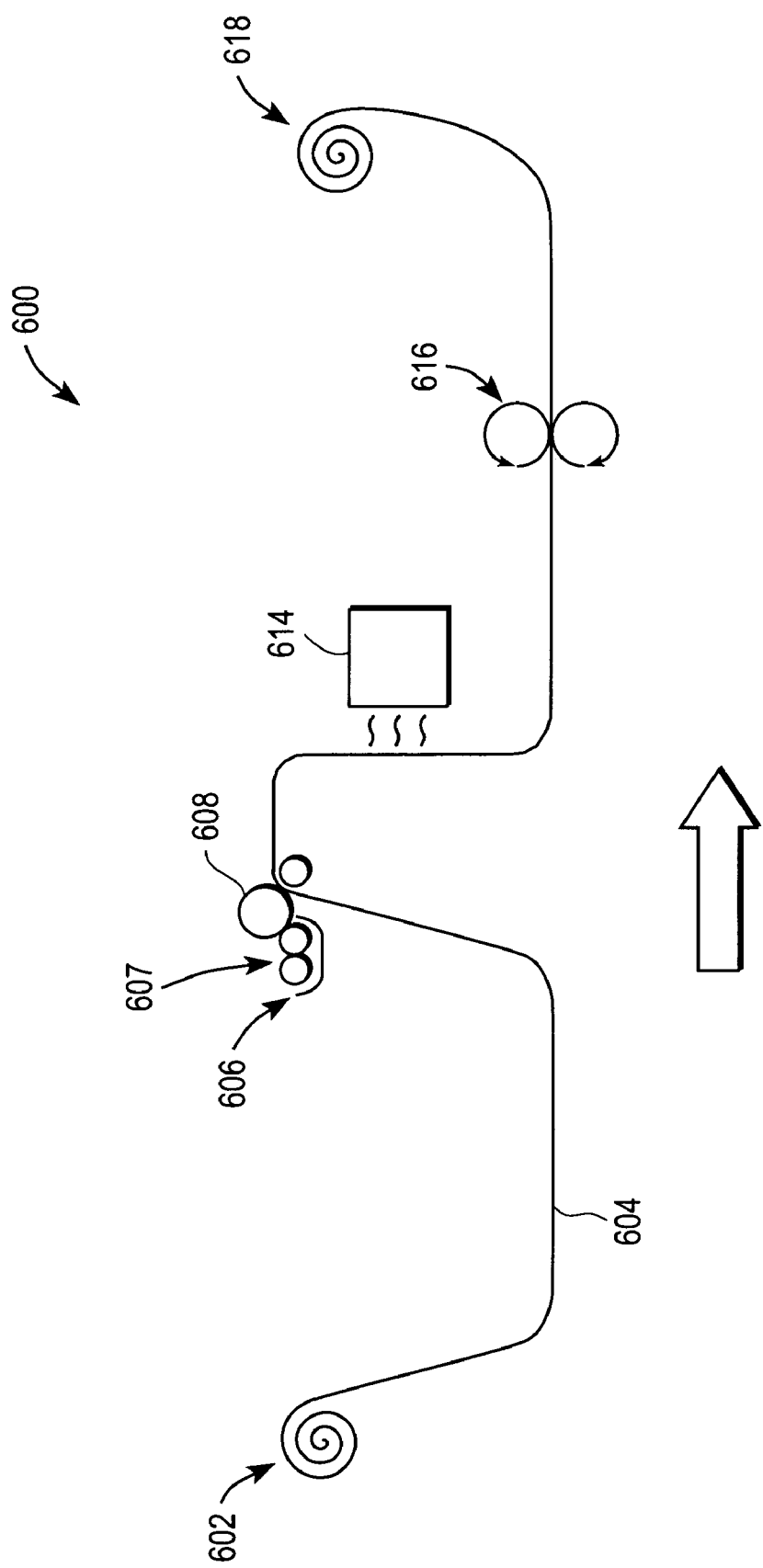
FIG. 6 illustrates an embodiment of an apparatus for applying a static dissipative material to a carrier web of antenna structures.

FIG. 6 illustrates an embodiment of an apparatus 600 for applying a static dissipative material to a carrier web of antenna structures. In one embodiment, the apparatus 600 processes a web 604 on which only antenna structures are deposited; i.e. the RFID ICs (straps) have not yet been attached. For example, the apparatus 600 may process a continuous roll of antennas similar to the roll 504 described above with respect to FIG. 5B. A source roll 602 of a carrier web 604 of antennas is advanced through the apparatus 600, from left to right as illustrated in FIG. 6. An applicator 606 includes a reservoir which is loaded with the static dissipative coating solution. Two rolls, 607, meter the coating solution up from the reservoir to the applicator roll, 608. In one embodiment, if two bands of static dissipative material are to be applied, as illustrated in FIG. 5C, the final applicator roll, 608, may have two raised stripes of rubber. A dryer 614 then dries the deposited dispersion of static dissipative material to evaporate the solvent. In one embodiment, where the static dissipative material includes tin oxide, after drying, an acrylic film with dispersed tin oxide is left adhered to the web 604. In one embodiment, the dryer 614 heats the web 604 to dry the deposited material. In one embodiment, rollers 616 advance the web 604 to be collected at roll 618, or to additional processing steps. It will be appreciated that the source roll may be replaced by another set of web processing machines which create a web material which includes the patterned antenna structures.

Figure 7:
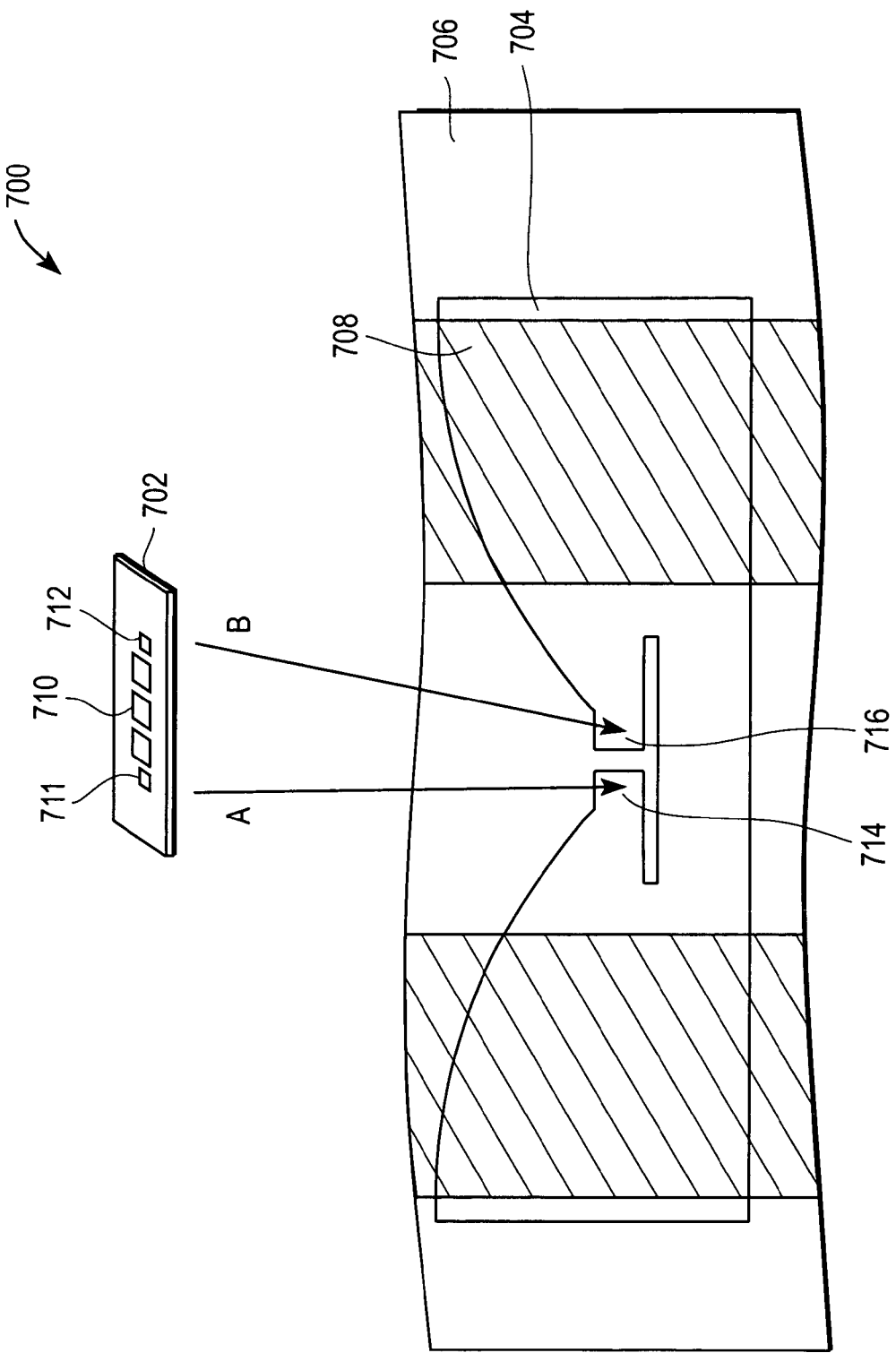
FIG. 7 illustrates an exploded view of an RFID inlet.

FIG. 7 illustrates an embodiment of an RFID tag 700. In particular, FIG. 7 illustrates the coupling of a flexible carrier strap 702 to web 706. The web 706 may include an antenna structure 704, similar to the result of the processing described above with respect to block 412 of FIG. 4. The antenna 704 is deposited to the carrier web 706, onto which two bands 708 of a static dissipative material have been deposited. The antenna 704, web 706, and static dissipative bands are similar to those described above with respect to FIG. 5C. The strap 702 includes functional components 710, such as an RFID IC. The strap also includes at least two strap connection pads 711 and 712 electrically interconnected to the RFID IC 710. The strap connection pads 711 and 712 are used to couple the flexible strap 702 to the antenna 704. The strap connection pads 711 and 712 are made out of conductive materials. For example, in one embodiment, a conductive adhesive can be used to couple the flexible strap 702 to the antenna 704 thereby establishing electrical interconnections for the functional components from the RFID IC in the flexible strap 702 to the antenna 704. In another embodiment, methods such as cold swaging or ultrasonic welding, which are well practiced in the field, can be used to couple the flexible strap 702 to the antenna 704.

In one embodiment, the antenna 704 may be made out of laminated drawn foil that has an adhesive containing layer which enables the antenna 704 to be coupled to the web 706 in any particular pattern (e.g. loops). In one embodiment, at two ends of the antenna 704, there are receiving connection pads 714 and 716. The receiving connection pads 714 and 716 are also made out of conductive materials to establish the conductive connection for the functional components from the web 706 to those from the flexible strap 702. In order to complete the circuitry of the antenna 704, the flexible strap 702 is coupled to the antenna 704. The coupling of the flexible strap 702 and the antenna 704 is achieved through the attachment of the strap connection pads 711 and 712 to the receiving connection pads 714 and 716 as shown by arrows A and B in FIG. 7. In one embodiment, where a static dissipative coating is applied across the entire antenna structure, including the receiving connection pads, a method of attachment is selected that is capable of bonding the strap to the antenna through the coating if the coating is present in the area of attachment. For example, in one embodiment, the strap is attached to the antenna using ultrasonic bonding. In one embodiment, straps are picked from a web of straps and placed onto the web of antennas, i.e. "pick and place." Pick and place systems use robotic manipulators that lift, move and place straps onto the antenna web in the desired location. In another embodiment, a web of straps is mated with a web of antennas in a web inlet process to attach the straps to the antennas.

In one embodiment, since a layer of static dissipative material 708 has been deposited onto the web 706, the likelihood of a damaging ESD event occurring during the strap attach process is reduced. Furthermore, in one embodiment, the coating of static dissipative material 708 remains coupled to the RFID tag 700 after the strap attach process, thereby continuing to reduce potential damage caused by an ESD event involving the tag 700.

During the course of RFID label assembly, the material often goes through conversions from a large area (e.g. carrier web) to smaller area (e.g. singulated RFID tag with antenna structure), and then reattached to another large area carrier web. In one embodiment, each time the large area static dissipative material is singulated (i.e. cut into segments including a single structure, for example, a single RFID tag), the new carrier web to which the singulated components are attached also provides a large continuous area of dissipative material.

For clarity, the embodiments described above generally relate to applying a band or stripe of static dissipative material to a carrier web of antennas. However, it will be appreciated that there are other processes, apparatuses, and compositions may be used to provide increased protection against ESD during RFID tag manufacturing. Several of these alternative embodiments are described below.

There are various static dissipative materials which may be incorporated with embodiments of the invention to reduce the likelihood of damaging ESD events during RFID tag manufacturing processes. For example, the following materials may be applied to or incorporated into the carrier web, alone or in combination with other materials. In one embodiment, an organic conductor material, such as for example, PEDOT (Poly-3,4-Ethylenedioxythiophene) or polyanaline, may be coated on or incorporated into the carrier web. Such materials have static dissipative properties and are made from intrinsically conductive polymers. A water solution of polystyrenesulfonate doped PEDOT suitable for use with embodiments of the present invention can be obtained from BAYER AG Germany under the trade name BAYTRON P. Another example of a material set having static dissipative properties that may be used with embodiments of the present invention includes ORMECON Lacquers and Coatings, available from Ormecon GmbH in Ammersbek, Germany, which consist of conductive organic particles dispersed in a coatable resin.

Another example of a material class having static dissipative properties for use with embodiments of the present invention is a waterborne coating with additives that improve the conductivity of the material. Typically these additives are comprised of small molecules or polymers that have a multitude of amino group functionality, carboxylic acid group functionality, or hydroxyl group functionality. Examples of additives include polyanaline, polyacrylic acid and polyhydroxyethylacrylate materials and their derivatives.

In one embodiment, graphite or carbon nanotubes may be coated on the carrier web. For example, a material class having static dissipative properties that may be used with embodiments of the present invention include carbon-based inks and resins, in which carbon black, graphite, carbon nanotubes, or carbon nanostructures such as buckminsterfullerene, or other graphitic materials are dispersed in a carrier.

In one embodiment, a conductor-filled organic material, such as metal or conductor particles and carbon nanoparticles, may be coated on the carrier web. Another example of a material class having static dissipative properties for use with embodiments of the present invention is conductive organic materials dispersed or dissolved in a material that can be deposited using a spray process. Such an example includes DF-200 (DUST FREE DF-200 (Antistatic Agent)) from NAMBANG CNA Company of Kyonggi-do, KOREA.

In one embodiment, semiconductor-filled organic material may be coated on the carrier web. In another embodiment, semiconductor particle materials may be coated on the carrier web. In one embodiment, non-insulating materials may be coated on the carrier web. In one embodiment, a thin film of material may be applied, such as for example copper, chromium, tin, tin oxide, indium, indium oxide, or indium tin oxide. In another embodiment, particles or filled-particle systems having nonlinear IV (current-voltage) characteristics may be coated on the carrier web.

Another example of a material class having static dissipative properties for use with embodiments of the present invention are waterborne or non-aqueous coatings filled with conductive particles or flakes. Examples of such materials are Novamet conductive nickel flakes, or Novamet conductive nickel powders, sold by Inco Specialty Products in Wyckoff, N.J. These materials are typically dispersed into acrylic, urethane, or vinyl polymers for coating.

In one embodiment, the resistivity range of the material applied to the carrier web is between about 500 to $10^{11}$ Ohms/sq. In another embodiment, the resistivity of the static dissipative material applied to the carrier web is greater than about 5000 Ohms/sq, and less than about $10^{11}$ Ohms/sq. In still yet another embodiment, the resistivity range of the static dissipative material applied to the carrier web is between about $10^5$ to $10^{10}$ Ohms/sq.

In one embodiment, a static dissipative material may be applied on the front side (antenna-side) of a carrier web of antennas in patterns other than the two distinct bands illustrated in FIG. 5C. For example, in one embodiment, the static dissipative material may be applied as a single thin film across the entire front side of the web. In one embodiment, however, it may be advantageous not to coat the area on the front side where the strap is attached to the antenna (i.e. the strap attach pads), to avoid interference with the strap attach process. Furthermore, to reduce material cost, in one embodiment, a few narrow continuous strips of static dissipative material may be applied to the front side of the web, rather than a wide coating (e.g. substantially the width of the web). In one embodiment, all conductive surfaces of the antenna web are completely covered by a static dissipative material. For example, by covering the conductive antenna with a static dissipative material, the risk of a damaging ESD current is reduced, in the event the antenna comes into direct contact with a conductive surface at a different electrical potential.

Alternatively, the static dissipative material may be applied uniformly across the backside surface of the web. This material may be applied in distinct bands, or other patterns. One advantage of applying the static dissipative material to the backside of the carrier web may be that the static dissipative material is less likely to interfere with the attachment of the strap to the antenna, as well as less likely to interfere with the performance of the antenna. In one embodiment, the static dissipative material may be applied to both the front and back sides of the carrier web.

In another embodiment, static dissipative material is applied to both the front and back sides of the carrier web, and the static dissipative materials on both sides are connected to each other, such as for example through apertures or through-holes in the web, or by static dissipative material applied to the side of the web. In another embodiment, different static dissipative materials are applied to each of the front and back sides of the carrier web. In another embodiment, static dissipative material is applied to each of the front and back sides of the carrier web in different patterns. For example, the front side may have static dissipative material deposited in a single continuous narrow band linking a plurality of antennas, whereas the back side of the carrier web may have a thin layer of static dissipative material deposited across the entire surface of the back side.

In embodiments where a static dissipative material is applied to a carrier web, for example, as a coating, the static dissipative material may be applied in various different patterns. In one embodiment, the static dissipative material may be applied in a pattern which is substantially continuous across a plurality of antenna structures. In one embodiment, the static dissipative material may be applied in a crosshatch pattern. In one embodiment, the static dissipative material may be applied as a single band. In one embodiment, the static dissipative material may be applied such that it is not continuous, but rather segments of the dissipative material are in contact with one or more antenna structures. For example, horizontal bands (i.e. perpendicular to the edge of the web) of the dissipative material may be applied on the front side, each band in contact with a single antenna structure. In one embodiment, the static dissipative material is not applied to the web in a continuous band or layer, but is instead non-uniformly or alternately applied such that adjacent antenna structures are interconnected via a segment of the static dissipative material. For example, in one embodiment, a first segment of static dissipative material spans across two adjacent antennas on their respective left sides, and a second segment of static dissipative material spans across one of the two antennas and another adjacent antenna on their respective right sides. In another embodiment, the front side of the carrier web for the conductive antennas is stripe coated with a material having static dissipative properties, such that a plurality of antenna structures are interconnected by the static dissipative material.

There are various methods for applying a static dissipative material to the antenna carrier web which may be used with embodiments of the present invention. For example, these methods include spray application, roll coating, gravure, reverse gravure, offset gravure, flexographic application, lithographic application, dip application, brush application, spin application, screen printing, curtain application, slot dip application, DR coating, comma or blade coating, sputtering, evaporation, painting, powder coating, chemical vapor deposition (CVD), and plasma enhanced chemical vapor deposition (PECVD), among other processing techniques.

In one embodiment, the adhesive used to attach the antenna structure to the web may incorporate a static dissipative material. For example, in one embodiment, where laminated copper is used to manufacture rolls of antennas, the laminate adhesive is formulated to have static dissipative properties. In one exemplary embodiment, an ITO powder is added to an epoxy adhesive prior to depositing the antenna structure to the carrier web.

In one embodiment, the carrier web itself may possess static dissipative properties. The carrier web material may incorporate a static dissipative material into its construction to provide a continuous static dissipative surface. For example, ITO powder may be incorporated into the PET web material. In another embodiment, fibers of a static dissipative material may be dispersed within the web material. Alternatively, in one embodiment, a PET carrier web may be coated with a static dissipative material (e.g. dispersed ITO) before the antenna is applied. In yet another embodiment, the carrier web may be made of a material having static dissipative properties. In another embodiment, a carrier web may be coated with a static dissipative material before the antenna conductor is deposited onto the web. In another embodiment, where the carrier web is formed by extrusion, the extrusion resin may include a conducting material.

In one embodiment, the static dissipative coating may be applied on any interface of an antenna structure. For example, the coating may be applied only on the conductive surface of the antenna. In another embodiment, the static dissipative material is applied as a coating between the antenna conductor and the antenna base film. In still yet another embodiment, the antenna structure may be at least partially embedded or buried within a static dissipative material. In one embodiment, a static dissipative material is applied to the carrier web after strap attach, to provide increased ESD protection.

In one embodiment, rather than applying a coating of a static dissipative material, a static dissipative tape, interleaf or release layer may be applied to the carrier web. Such material may be referred to as ESD tape, and in general have the dissipative properties of the coatings described herein. In one embodiment, the ESD tape is applied to the top side of the antenna web to reduce a strong charge build up on any of the antennas. The ESD tape is typically a thin planar material. In one embodiment, the ESD tape may be adhesive on at least one side. For example, in one embodiment, a narrow band of static dissipative tape is applied to the carrier web such that the adhesive side contacts the antenna side of the carrier web. The tape may be positioned on the carrier web such that it does not interfere with the strap attachment. In one embodiment, a continuous length of ESD tape is applied on the roll to couple a plurality of antenna structures together. In an alternate embodiment, the ESD tape may be applied to the back side of the antenna carrier web. In one embodiment, the ESD tape is made of paper. For example, during at least a portion of the RFID tag processing, a continuous paper strip is coupled to the carrier web. In one embodiment, the ESD tape includes conducting fibers, such as metal or graphite fibers. In another embodiment, the ESD tape is made of a controlled conductivity paper.

An example of a material class having static dissipative properties that may be used with embodiments of the present invention includes conductive tapes that can be applied to another substrate. An example of such a material is a conductive tape comprising CABELEC conductive materials. CABELEC materials are available from Cabot Corporation of Leuven, Belgium.

In one embodiment, the static dissipative material is temporarily applied (not permanently applied) to the carrier web. For example, in one embodiment, a static dissipative material is applied to the antenna carrier web prior to strap attach, which may then be removed after strap attach. One example is that of an ESD tape. In one embodiment, a static dissipative coating, once applied, may be removed or worn off. In another embodiment, the static dissipative coating is permanent or is an integral part of the antenna structure.

In one embodiment, adjacent antennas may be directly conductively coupled together. For example, in one embodiment, a continuous trace of copper may connect (short) a plurality or all of the antennas on a roll together. This may be accomplished during the etching process. By conductively coupling a plurality (or all) of the antennas on a carrier web roll, the total surface over which a charge may be dissipated is effectively increased. The coupled antennas may then be singulated during conversion of the RFID tag to an RFID label. In one embodiment, after strap attach, the continuity of the conductive strip between adjacent antennas may be severed (permanently or temporarily) for purposes of testing adjacent devices on a roll.

Figure 8:
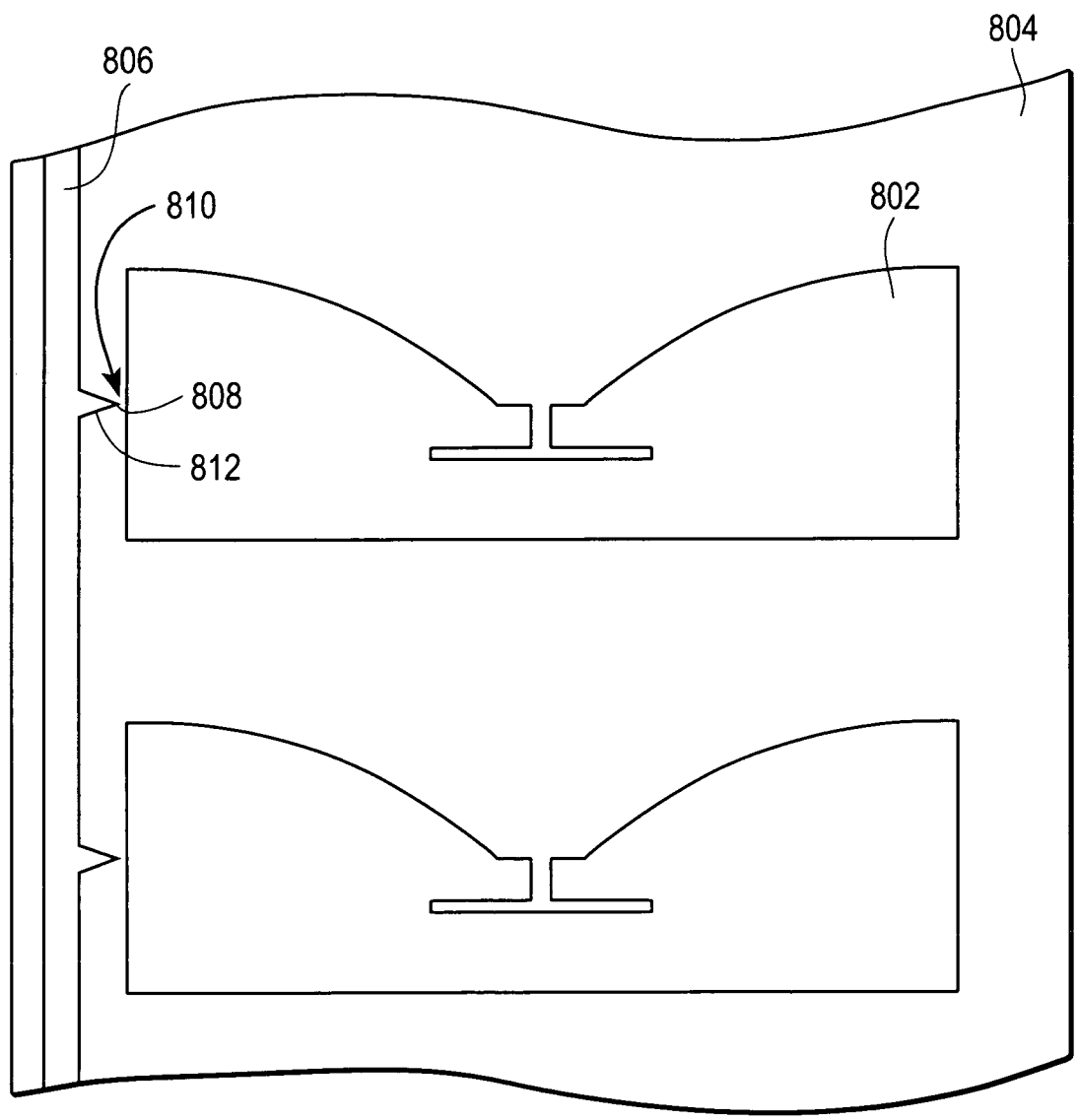
FIG. 8 illustrates an embodiment of a web of antennas having a spark gap apparatus.

FIG. 8 illustrates an embodiment where each of the antennas 802 are separate from each other on the carrier web 804, however, a continuous conductive strip 806 is attached to the carrier web 804 adjacent to, but not in contact with, the antenna structures 802. At each antenna structure, a protrusion 812 of the conductive strip 806 extends towards the antenna structure 802, coming to a point 808 proximate to the side of the antenna structure 802, leaving a small gap 810 between the point 808 and the antenna 802. This gap 810 is referred to as a spark gap 810, and is designed such that should an ESD event occur, the discharge occurs between the point 808 and the antenna 802, and not between the antenna and RFID IC. The gap has a width that is small enough to permit discharges to occur at a relatively lower voltages, thereby avoiding large charge buildup which can lead to ESD events capable of damaging the RFID IC. This allows for periodic purging of any built up charge, before the charge gets large enough to elicit a potentially damaging high voltage ESD event.

In one embodiment, the antenna web and strap is sandwiched between a cover sheet, and a temporary adhesive, such as a pressure sensitive adhesive (PSA) or a UV-release adhesive, on a release layer. The antenna web and cover sheet are die cut (small area), leaving them attached by the temporary adhesive to the release layer (large area). In one embodiment, the adhesive could be continuous and unbroken. Any of the adhesive materials on the release layer (front or back side) may have static dissipative properties, such as may be imparted by coating with a static dissipative material. When the label is removed from the carrier, a static dissipative adhesive will lower the amount of charge that is built up on the label during the separation process. The likelihood of a static discharge event damaging the IC once it is sandwiched between two other non-conductive/static dissipative materials is much lower than when the conductive antenna is exposed. In another embodiment the antenna and strap on the carrier substrate is covered and encapsulated by an adhesive on a removable layer. In one embodiment, the adhesive on the removable layer may be static dissipative to prevent charge from being generated and held on the label when the release layer is removed.

Measures against ESD protection may also be implemented within the web processing apparatus. For example, the rollers may be non-conductive. In one embodiment, the rollers may be insulated or made of an insulating material. In another embodiment, the roller may be made of, or coated with, a static dissipative material. For example, the surface of the roller that contacts the web may be made of cork or paper. Additionally, other measures for controlling charge and ESD may be implemented in the environment in which the processing is performed. For example, the RFID tags may be manufactured in an environment having ionized air, or a humid environment. In another embodiment, the apparatus may be designed such that the back side of the carrier web remains grounded during the processing to suppress the static field, although charge may remain on the web. In one embodiment, equipment handling the web, such as rollers, may be grounded to minimize charge buildup on the equipment. In another embodiment, equipment that contacts the web antenna conductors directly is static dissipative or non-conductive at the interface to prevent fast, damaging discharges to ground. Furthermore, ESD protection may be implemented within the RFID IC itself.

Figure 9:
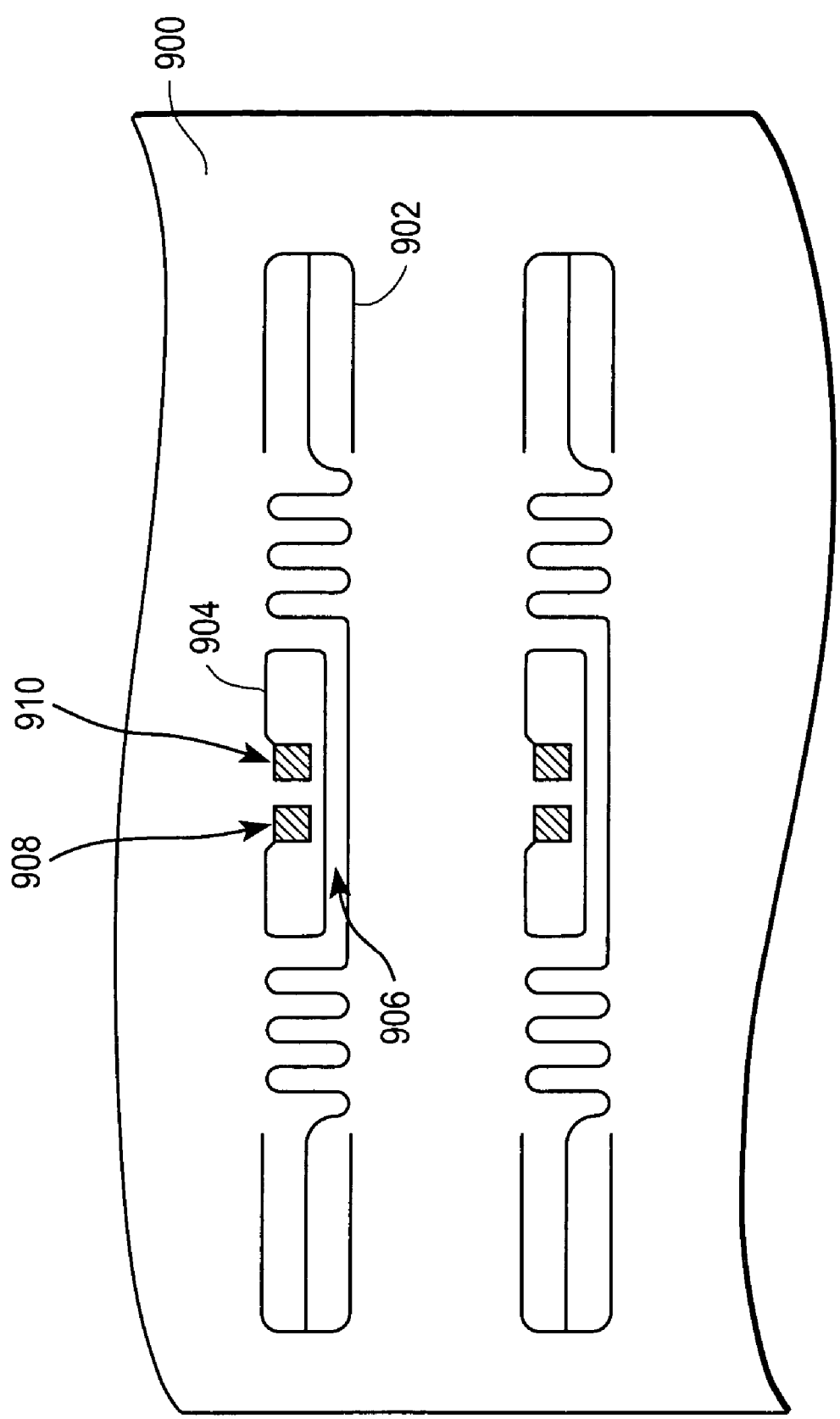
FIG. 9 illustrates an embodiment of a carrier web having inductively or capacitively coupled antenna structures.

In one embodiment, as a further protection against damaging ESD events, the RFID tag may be designed such that there is not a direct physical connection between the integrated circuit of the strap and the antenna structure. For example, the antenna may be interdigitated with the RFID IC, so that the RFID IC is inductively or capacitively coupled to the antenna. By eliminating a direct physical connection between the antenna and the IC, the likelihood of an ESD event damaging the IC is reduced. In one embodiment, this type of inductive antenna design may be incorporated with the other ESD protection measures described above, such as for example, applying a static dissipative coating. FIG. 9 illustrates an embodiment of a carrier web 900 having inductively or capacitively coupled antennas. As illustrated, each segment includes a primary antenna structure 902 and a secondary antenna structure 904. A gap 906 between the traces of the antennas 902 and 904 allows them to be inductively or capacitively coupled, while the gap 906 also avoids a physical interconnection between the antennas 902 and 904. A strap having an RFID IC connects to the secondary antenna 904 at connection pads 908 and 910. When connected to the secondary antenna 904, the strap is not physically interconnected with the primary antenna 902. Thus, should an ESD event occur between the primary antenna 902 and another material, there is a reduced chance that the ESD event will affect the RFID IC of the strap, since it is physically unconnected to the primary antenna 902. It will be appreciated that other designs are possible for inductively or capacitively coupled antennas for use with RFID devices.

It will be appreciated that one or more of the embodiments described herein may be implemented together, to provide increased protection from ESD during the manufacturing process. For example, in one embodiment, a spark gap arrangement, such as that as illustrated in FIG. 8, may be used in conjunction with applying a static dissipative coating to the front side of the carrier web, such as that illustrated in FIG. 5C.

The methods and apparatuses described herein may be applied to the manufacture, either roll-to-roll or otherwise, of RFID tags and labels operating in a variety of tag frequencies, such as, but not limited to, any of the 915 MHz, 866 MHz, 950 MHz, or 2.45 MHz RFID tag frequencies. It will also be appreciated that embodiments of the methods and apparatuses described herein may be implemented with devices and associated manufacturing processes other than RFID devices. For example, application of static dissipative materials may be used in the manufacture of devices such as displays, antennas, sensors, etc. Further, embodiments of the methods and apparatuses described herein may be used with ICs other than specifically RFID ICs, such as for example, ICs used in wireless devices such as radios and wireless local area network (LAN) devices, among others.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for manufacturing radio frequency identification (RFID) tags comprising:
   applying a plurality of RFID antenna structures onto a first side of a web material;
   applying a static dissipative material to the web material; and
   coupling an RFID integrated circuit (IC) to one of the plurality of antenna structures on the first side of the web material.

2. The method of claim 1, wherein applying the static dissipative material comprises applying the static dissipative material to the first side of the web material, the static dissipative material in contact with a plurality of the antenna structures.

3. The method of claim 2, wherein the static dissipative material is continuous across a plurality of the antenna structures.

4. The method of claim 3, wherein the static dissipative material is applied as a coating.

5. A method for manufacturing radio frequency identification (RFID) tags comprising:
   applying a plurality of RFID antenna structures onto a first side of a web material;
   applying a static dissipative material to the first side of the web material, wherein the static dissipative material is in contact with and continuous across a plurality of the antenna structures and the static dissipative material is applied as continuous strip intersecting the plurality of antenna structures.

6. The method of claim 1, wherein the static dissipative material is applied to a second side of the web material.

7. The method of claim 1, wherein the static dissipative material on the first side of the web material is connected to the static dissipative material on the second side of the web material.

8. The method of claim 1, wherein the static dissipative material is selected from the group consisting of tin oxide, indium oxide, and indium tin oxide (ITO).

9. The method of claim 1, further comprising testing an RFID tag while the RFID tag is attached to the web material, the RFID tag including the RFID IC and one of the plurality of antenna structures.

10. The method of claim 1, wherein the static dissipative material has a resistivity of between about 500 Ohms/sq to about $10^{11}$ Ohms/sq.

11. An apparatus comprising:
a web material;
a plurality of radio frequency identification (RFID) antenna structures deposited on a first side of the web material; and
a static dissipative material coupled to the web material, wherein the static dissipative material is not applied to a strap attach portion of each of the plurality antenna structures.

12. The apparatus of claim 11, wherein the static dissipative material is applied on the first side of the web material.

13. The apparatus of claim 11, wherein the static dissipative material contacts a plurality of the antenna structures.

14. An apparatus comprising:
a web material;
a plurality of radio frequency identification (RFID) antenna structures deposited on a first side of the web material; and
a static dissipative material coupled to the web material, wherein the static dissipative material contacts a plurality of the antenna structures and is not applied to strap attach pads of each of the plurality of the antenna structures.

15. An apparatus comprising:
a web material;
a plurality of radio frequency identification (RFID) antenna structures deposited on a first side of the web material; and
a static dissipative material coupled to the web material, wherein the static dissipative material contacts a plurality of the antenna structures and a plurality of bands of the static dissipative material are applied to the first side of the web material, each band contacting a plurality of the antenna structures.

16. The apparatus of claim 11, wherein the static dissipative material is applied on a second side of the web material.

17. The apparatus of claim 11, wherein the web material includes the static dissipative material.

18. The apparatus of claim 17, wherein the static dissipative material includes conducting fibers embedded in the web material.

19. The apparatus of claim 11, wherein the web material comprises plastic.

20. The apparatus of claim 11, wherein the web material comprises paper.

21. The apparatus of claim 11, wherein the static dissipative material is selected from the group consisting of tin oxide, indium oxide, and indium tin oxide (ITO).

22. The apparatus of claim 11, further comprising a strap attached to one of the plurality of antenna structures, the strap including an RFID integrated circuit (IC).

23. The apparatus of claim 11, wherein the antenna structures are attached to the web material by an adhesive, the adhesive including the static dissipative material.

24. An apparatus for applying a static dissipative material to a substrate, the apparatus comprising:

means for advancing the substrate through the apparatus, wherein the substrate is a web material having a plurality of radio frequency identification (RFID) antenna structures deposited thereon, wherein the means for advancing the web material includes a roller; and
means for applying a static dissipative material to the web.

25. The apparatus of claim 24, wherein the means for dying the static dissipative material applied by the means for applying.

26. The apparatus of claim 24, wherein the means for applying the static dissipative material includes a reservoir for storing the static dissipative material.

27. The apparatus of claim 26, wherein the static dissipative material includes dispersed tin oxide powder in an acrylic coating solution.

28. An apparatus for applying a static dissipative material to a substrate, the apparatus comprising:
at least one roller to advance the substrate through the apparatus, wherein the substrate is a web material having a plurality of radio frequency identification (RFID) antenna structures deposited thereon; and
an applicator to apply a static dissipative material to the web.

29. The apparatus of claim 28, further comprising a dryer to dry the static dissipative material applied by the applicator.

30. The apparatus of claim 28, wherein the applicator includes a reservoir to store the static dissipative material.

31. The apparatus of claim 30, wherein the static dissipative material is a dispersion including tin oxide.

32. The apparatus of claim 28, wherein the roller is insulated.

33. A method for manufacturing radio frequency identification (RFID) tags comprising:
applying a plurality of RFID antenna structures onto a first side of web material;
coupling together electrically the plurality of antenna structures on the web material; and
coupling an RFID integrated circuit (IC) to one of the plurality of antenna structures.

34. The method of claim 33, wherein the plurality of antenna structures are coupled together electrically by a static dissipative material applied to the first side of the web material.

35. The method of claim 34, wherein the static dissipative material is applied as a coating.

36. The method of claim 34, wherein the static dissipative material is applied to a second side of the web material.

37. The method of claim 34, wherein the static dissipative material is selected from the group consisting of tin oxide, indium oxide, and indium tin oxide (ITO).

38. A method for testing further comprising testing an RFID tag while the RFID tag is attached to the web material, the RFID tag including the RFID IC coupled to one of the plurality of antenna structures, and while there are a plurality of other RFID tags, with their corresponding RFID ICs coupled to their corresponding antennas, also on the web material.

39. A method for manufacturing radio frequency identification (RFID) tags comprising:
applying a plurality of RFID antenna structures onto a first side of web material; and coupling together electrically the plurality of antenna structures on the web material, wherein the plurality of antenna structures are coupled together electrically by a continuous strip, the strip being made of the same material as the plurality of antenna structures.

40. A method for manufacturing radio frequency identification (RFID) tags comprising:

attaching an RFID integrated circuit (IC) to a web material having a plurality of radio frequency identification (RFID) antenna structures attached thereto; and reducing static discharge during the attaching, wherein reducing static discharge comprises applying a static dissipative material to the web material prior to attaching the RFID IC.

41. The method of claim 40, wherein the static dissipative material is selected form the group consisting of tin oxide, indium oxide, and indium tin oxide (ITO).

42. A method for manufacturing radio frequency identification (RFID) tags comprising:

attaching an RFID integrated circuit (IC) to a web material having a plurality of radio frequency identification (RFID) antenna structures attached thereto; and reducing static discharge during the attaching, wherein reducing static discharge comprises processing the web material in an apparatus including a static-dissipative roller.

43. A method for manufacturing radio frequency identification (RFID) tags comprising:

attaching an RFID integrated circuit (IC) to a web material having a plurality of radio frequency identification (RFID) antenna structures attached thereto; and reducing static discharge during the attaching, wherein reducing static discharge comprises processing the web material in an apparatus including an insulated roller.

* * * * *